UNITED STATES PATENT OFFICE.

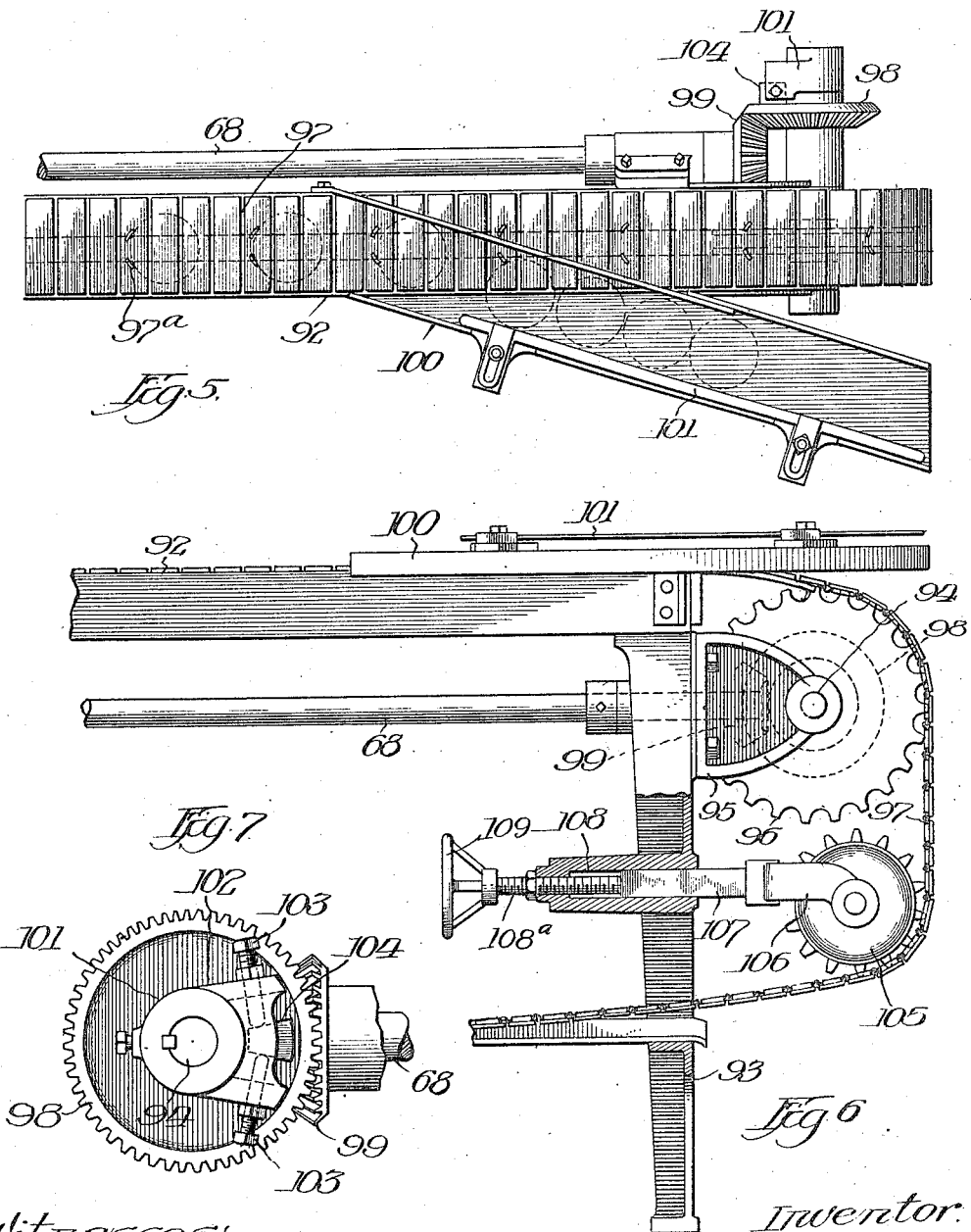

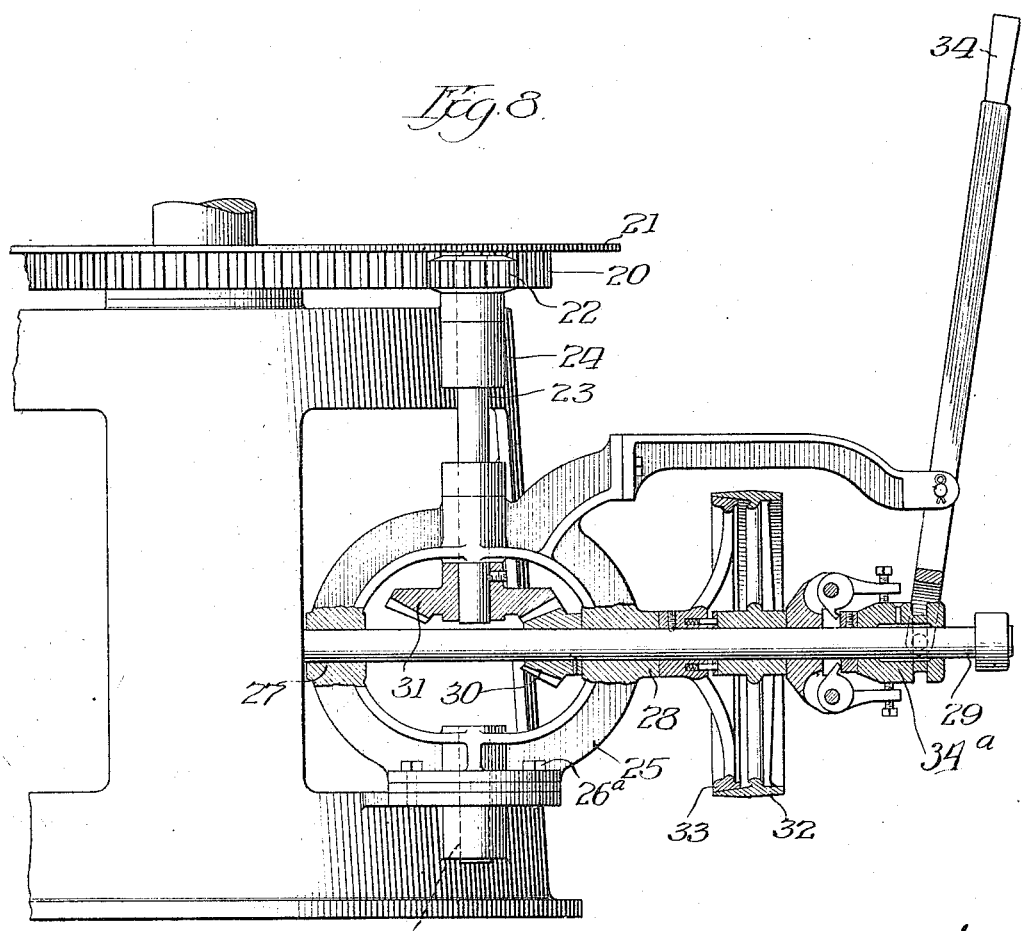

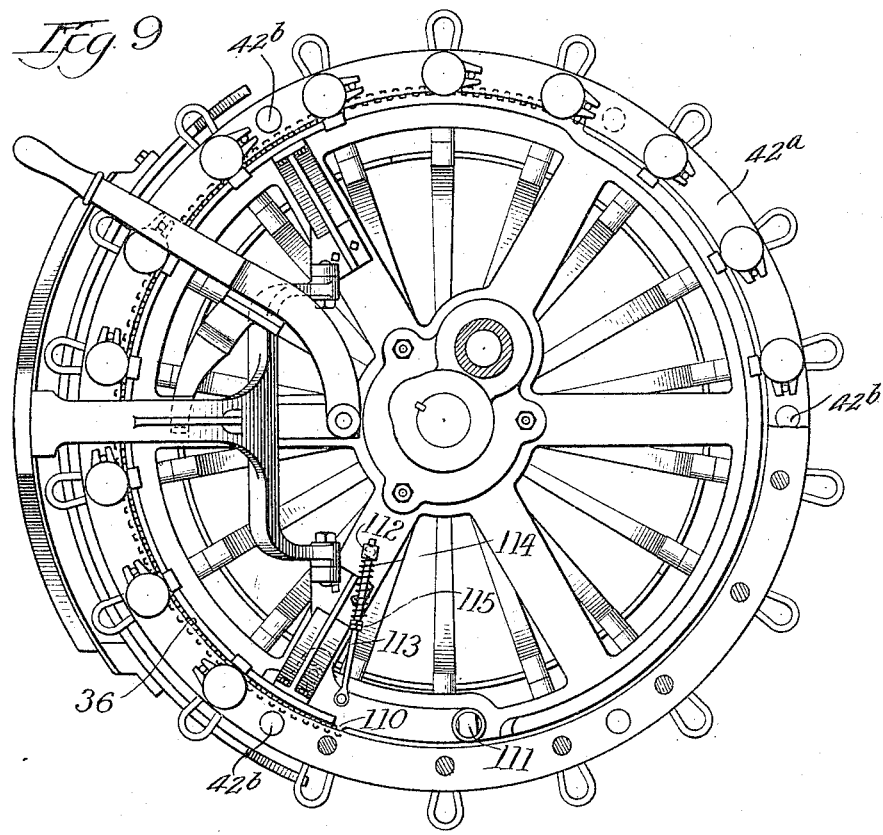
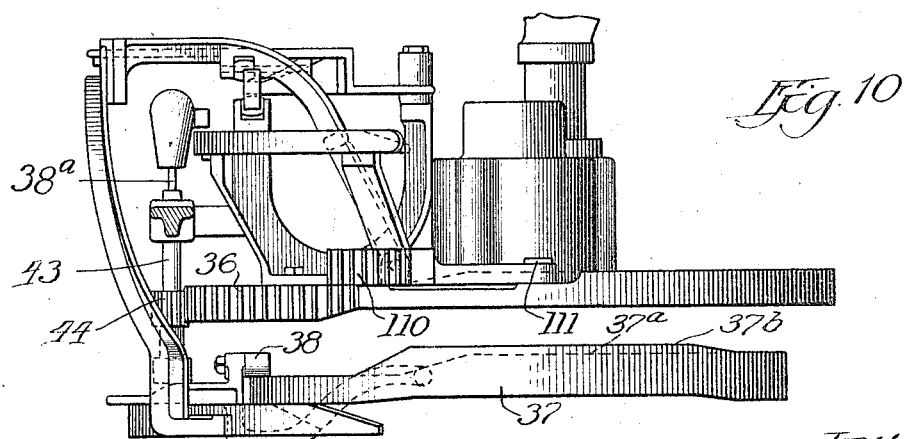

JAMES P. HAIGHT, OF MERCED, CALIFORNIA, ASSIGNOR TO SPRAGUE CANNING MACHINERY COMPANY, OF CHICAGO, ILLINOIS, A CORPORATION OF ILLINOIS.

ROTARY CAN-CAPPER.

1,237,897.          Specification of Letters Patent.     Patented Aug. 21, 1917.

Application filed October 5, 1914. Serial No. 865,071.

*To all whom it may concern:*

Be it known that I, JAMES P. HAIGHT, a citizen of the United States, residing at Merced, in the county of Merced and State of California, have invented new and useful Improvements in Rotary Can-Cappers, of which the following is a full, clear, concise, and exact description, reference being had to the accompanying drawing, forming a part of this specification.

My invention relates to improvements in rotary can cappers.

It is one of the objects of my invention to provide a rotary can capper in which the parts for feeding the cans are independent of the can discharging parts.

A further object of my invention is to provide means whereby the various parts that move the cans in spaced relation may be independently adjusted to bring them in proper timed relation.

Still further objects of my invention are to provide a can capper having an improved form of transmission whereby the capper may be set up in any position irrespective of the main line shafting; to provide an improved form of fire box; and to provide a capper economical to manufacture and simple and efficient in its operation.

Additional objects and advantages of my invention will be apparent from the following description taken in connection with the appended claims.

I have described in the following specification and illustrated in the accompanying drawings a rotary can capper constructed in accordance with my invention, it being understood that numerous changes may be made in the form, construction and arrangement of the parts without departing from the spirit of my invention or exceeding the scope of the appended claims, the form of the invention herein disclosed being merely one preferred embodiment thereof.

In the drawings:

Fig. 5 is a top plan view of the discharge conveyer and chute;

Fig. 6 is a view in side elevation of the parts shown in Fig. 5;

Fig. 7 is a similar view showing in detail a portion of Fig. 5;

Fig. 8 is a side elevation with parts in section showing the transmission mechanism;

Fig. 9 is a top plan view of the capper with parts removed; and

Fig. 10 is a side elevation with parts removed, taken from the front of Fig. 9.

Figure 1:
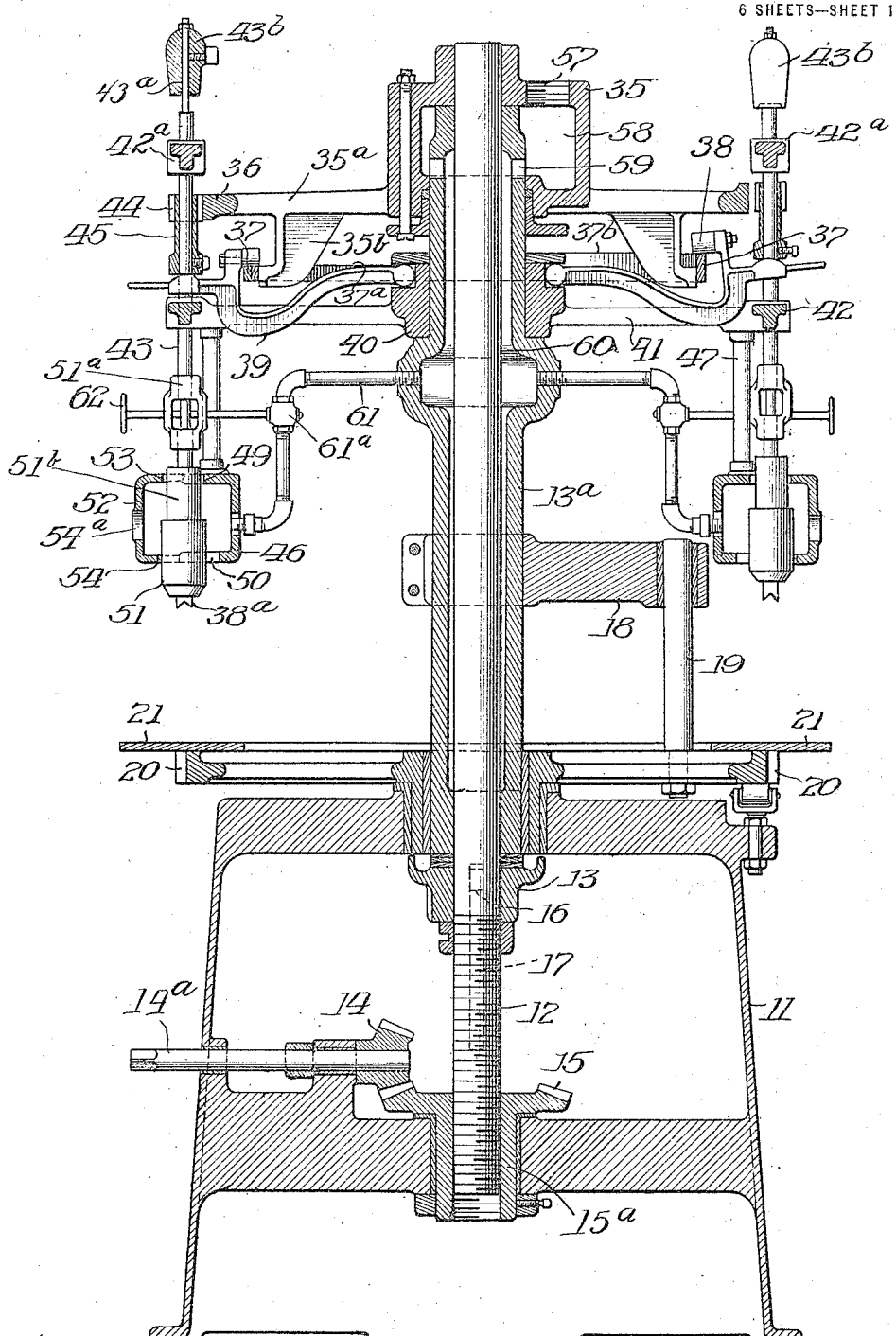
Figure 1 is a cross sectional view of a rotary can capper constructed in accordance with my invention, the section being taken on the line 1—1 of Fig. 2, looking in the direction of the arrows.

Referring to the drawings, centrally mounted on a supporting base 11 is an upright shaft 12 having non-rotatably secured thereto a step bearing 13 on which rests a central chambered column $13^a$ so as to be rotatable about the shaft.

The shaft 12 carrying the central column may be raised or lowered to adjust the capping parts to cans of various heights by means of inter-meshing bevel gears 14 and 15, a collar $15^a$ on the latter being in screw-threaded engagement with the shaft, gear 14 being turned by a shaft $14^a$ having a square end for an operating crank, but the shaft is made non-rotatable by means of a stud 16 secured to the bearing 13 engaging a slot 17 in the base 11.

The column $13^a$ carries an arm 18 in which is secured a pin 19 the other end of which is secured to a large gear 20 on which is secured a table 21 for the cans. It will be seen that rotation of the gear 20 will carry with it the table 21 and the central column $13^a$. This rotation of the gear 20 is derived from a pinion 22 (Fig. 8) with which it meshes, mounted on a shaft 23 journaled in a bearing 24, on the supporting base 11, and having also a bearing in a bracket 25. This bracket 25 is loosely mounted on a pin 26 on the base 11 in alinement with shaft 23 to give the bracket a swivel connection. It is secured in any position by means of pins $26^a$ passing through flanges on the bracket and base. The bracket has bearings 27 and 28 for a horizontal drive shaft 29 having mounted thereon a bevel pinion 30 meshing with a bevel gear 31 on the end of the shaft 23. Rotatable on and slidable along the shaft 29 is a pulley 32 which is driven in any suitable manner and which forms with a fixed drum 33 on the shaft a friction clutch to transmit the power to the shaft 29. The slidable drum is moved into and out of clutching engagement by means of a lever 34 fulcrumed on an arm of the bracket 25 and engaging a slidable clutch cone $34^a$ connected with the slidable pulley 32.

As will be apparent, when the driving pulley is in clutching engagement with the drum 33 its power is transmitted to the pinion 22 which drives the table and central column, via the shaft 29, gears 30, 31 and shaft 23.

The capper may be set up practically irrespective of the position of the main line shafting as the bracket 25 may be swiveled about its pivotal axis to present the drive pulley 32 at any angle necessary.

Referring again to Fig. 1, the shaft 12 has fixedly secured thereto, near the top thereof, a chambered member 35, radiating arms $35^a$ of which carry a segmental gear 36 for causing rotation of the capping steels as hereinafter described. Depending from the arms $35^a$ are brackets $35^b$ which support a cam track 37 having a normal surface and two cam surfaces $37^a$, $37^b$, on which travel rollers 38 on lifting arms 39, the inner ends of which are pivotally supported on a shoulder formed on the collar 40 of a spider 41, said collar being secured to the central column $13^a$ to rotate therewith, the spider having a ring 42 secured thereto, said ring being connected to and supporting a second ring bearing $42^a$ by means of rods $42^b$ (Fig. 9) extending between the rings 42 and $42^a$, said rings providing bearings for steel supporting sleeves 43 whereby the latter are carried with the rotation of the other parts and, at the same time, are vertically slidable to place the capping steels in and out of contact with the cans, as hereinafter described. Slidably embraced by the steel supporting sleeves 43 are vent rods $43^a$ which are topped by weights $43^b$ to cause them to descend by gravity into contact with the cans, as hereinafter set forth, engagement of the weights with ring bearing $42^a$ limiting such movement.

In order that the capping steels may be rotated during the soldering process, each steel supporting sleeve 43 has mounted thereon a pinion 44 meshing with the stationary segmental gear 36 as the sleeves are driven past the latter by the rotation of the central column. Depending from the pinions 44 are collars 45 bearing on the lifting arms 39 so that the steels may be raised or lowered according to the position of the lifting arm rollers 38 on the cam track 37 as is hereinafter described.

Associated with each capping steel is a fire box 46. The back part of these fire boxes is formed by a channeled ring composed of a plurality of segmental castings 48 (Fig. 2) secured together in any suitable manner. This ring may be one circular piece but it is more practicable to cast it in three or four parts. The upper and lower ribs of these channeled castings 48 are provided with apertures 49, 50 for the passage through the fire boxes of the capping steels 51, which are suspended from the sleeves 43 by yokes $51^a$, and bushings $51^b$ embracing the sleeves 43 and resting on the capping steels so as to extend through the upper opening 49. The fire boxes are completed by front caps 52 having upper and lower openings 53, 54 for the steels and bushings corresponding with the apertures 49 and 50, and front air inlets $54^a$. These caps 52 are secured to the rear channeled segments 48 by means of hooks 55 which engage corresponding lugs 56 formed on the latter.

Fuel for the fire boxes is supplied at a main port 57 opening into a chamber 58 formed by the stationary member 35. It passes thence through ports 59 opening into the interior of the central column, down the latter to an enlarged chamber 60 communicating with which are a plurality of pipes 61 leading to the fire boxes 46, one pipe for each fire box. To regulate the fuel supply each pipe 61 has a valve $61^a$ operated by a valve handle 62 extending out far enough to be readily accessible.

Figure 2:
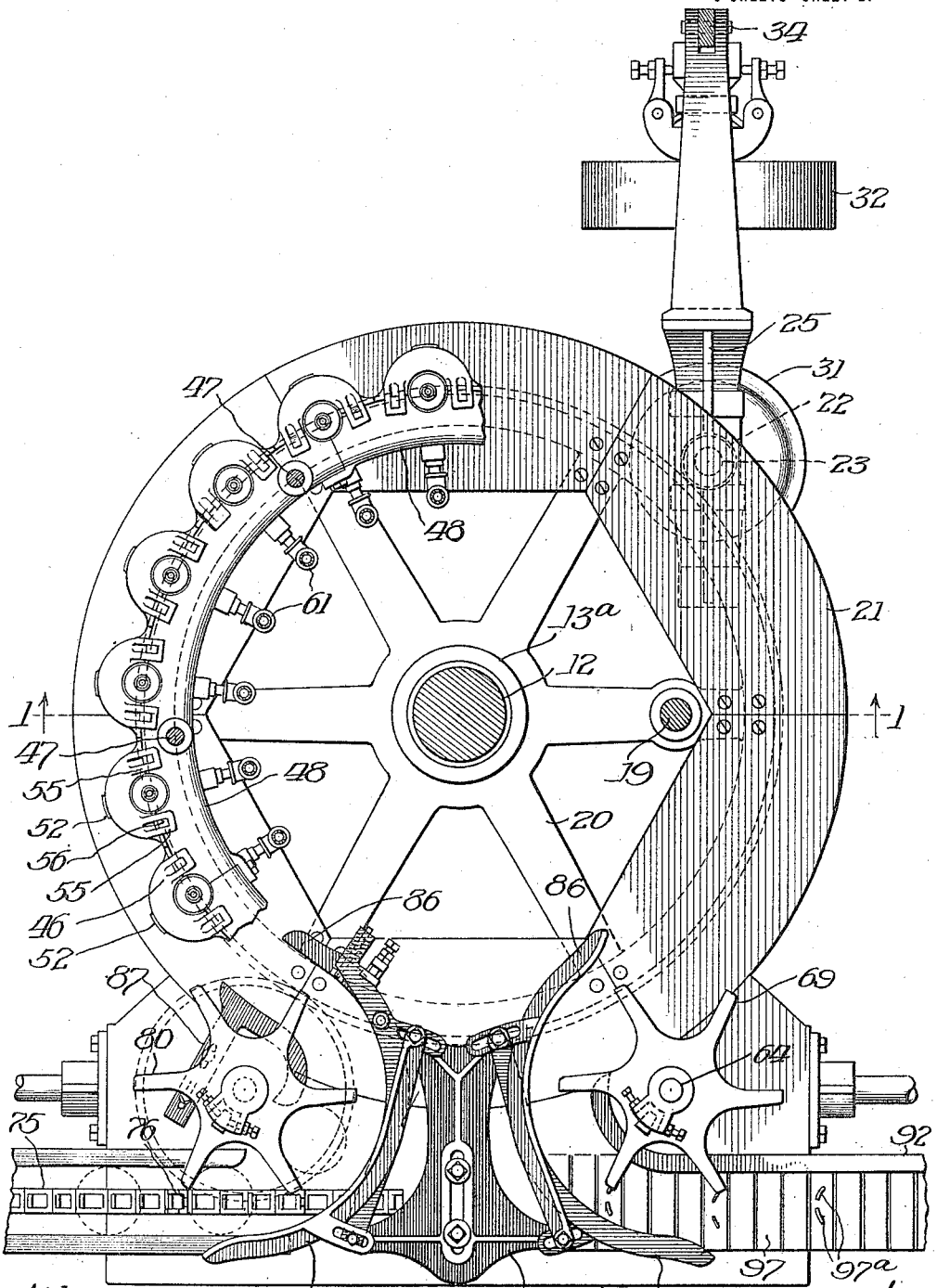
Fig. 2 is a horizontal cross sectional view of the structure shown in Fig. 1 with parts removed and parts broken away.
Figure 3:
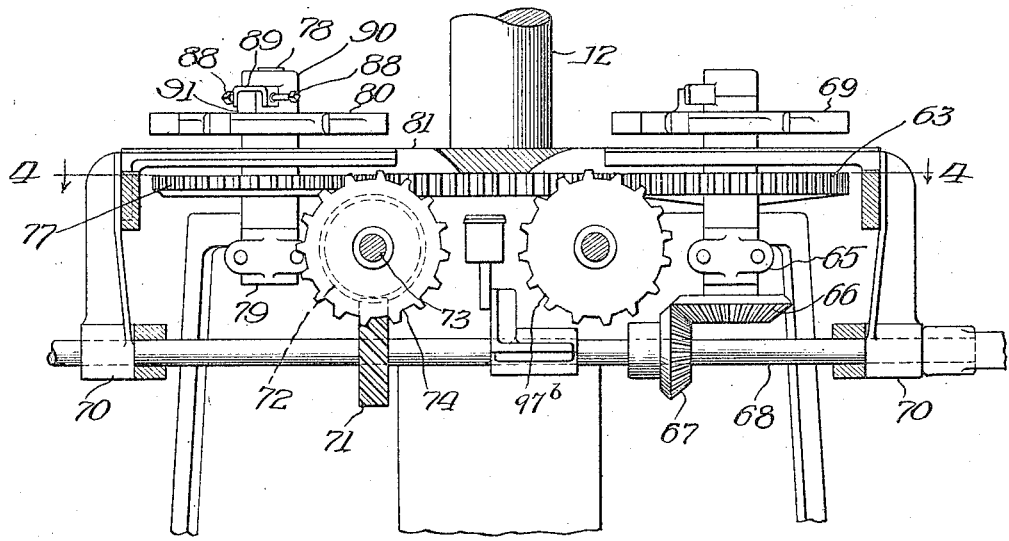
Fig. 3 is a cross sectional view taken on the line 3—3 of Fig. 4, looking in the direction of the arrows.
Figure 4:
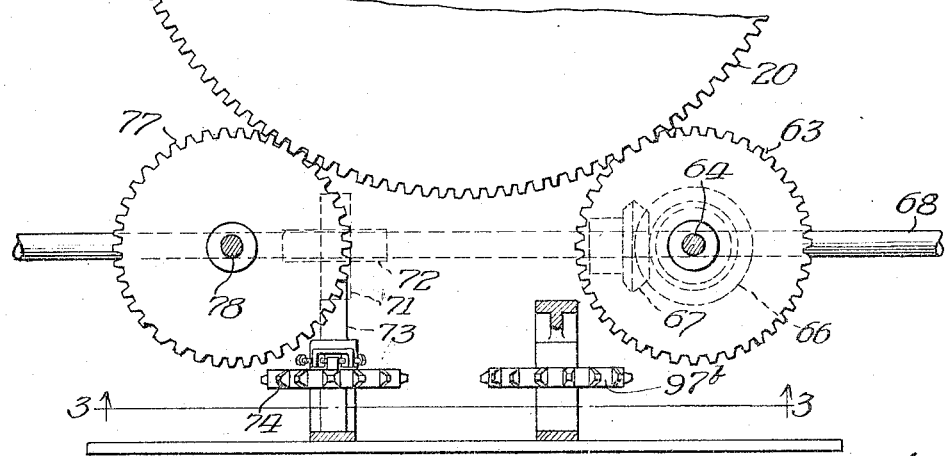
Fig. 4 is a similar view taken on the line 4—4 of Fig. 3.

Referring to Figs. 2, 3 and 4, the mechanism for feeding and discharging the cans will now be described. As already set forth the large table gear 20 is driven by pinion 22 which derives its power from the main drive shaft 29. Meshing with this gear 20 is a gear 63 mounted on a shaft 64 which is journaled in a bearing 65 and has secured to its lower end a bevel-pinion 66 meshing with a bevel-gear 67 on a horizontal shaft 68. Shaft 64 also drives a discharging star-shaped sweep 69 connected with its upper end.

On the shaft 68 which is journaled in bearings 70 is a spiral gear 71 meshing with another spiral gear 72 on a stub shaft 73 which carries also a sprocket 74. Rotation of the latter drives a conveyer chain 75 which carries the cans toward the table, the chain being provided with spaced lugs 76 for engaging each can.

Also meshing with table gear 20 to be driven thereby is a gear 77 on a shaft 78 journaled in bearing 79 and carrying at its upper end a feeding star-sweep 80.

Contiguous to the rotating table 21 is a stationary table 81 which extends outwardly beneath the feeding and discharging sweepers. Secured to this table is a bracket 82 carrying arcuate guides 83 and 84 substantially concentric with the feed and discharge sweeps respectively, the inner ends 86 of which extend well over the rotating table 21. To aid in properly positioning the cans, a centering guide 87 is located across the path of the cans from the guide 83. The star-sweeper 80 is rotatably adjustable on its shaft 78 so that it may be timed with relation to the position of the cans. The sweep itself is loose on the shaft and screws 88 (Fig. 3) threaded in a bifurcated lug 89 on a collar 90 which is fast on the shaft 78 bear on a lug 91 formed on the sweep, thus forming a driving connection between sweep and shaft such that the former may be adjusted to properly time its movement with respect to the cans.

Similar means are provided for adjusting discharge sweep 69 and sprocket 74.

Extending from adjacent the discharge sweep 69 is a discharge table 92 supported at its outer end by legs 93. A stub shaft 94 journaled in a bearing bracket 95 secured to the leg 93 carries a sprocket 96 for driving the discharge conveyer 97 on which are spaced lugs 97ª for engaging the cans, the inner end of the conveyer traveling in an idler sprocket 97ᵇ. This discharge conveyer extends away from the table a substantial distance and is substantially in alinement with the feeding conveyer. To drive the sprocket 96 on the shaft 94 is also a bevel-gear 98 meshing with a similar gear 99 on the end of the shaft 68 which is rotated as above set forth. The cans are deflected from the conveyer 97 by a chute 100 with which is associated an adjustable guide member 101.

In order to adjust the timing of the discharge conveyer its driving gear 98 is itself loose upon shaft 94, a collar 102 fast on the shaft having a bifurcated portion on which are threaded screws 103 engaging opposite sides of a lug 104 on the gear wheel.

The conveyer chain 97 is kept at the desired tension by means of an idler sprocket 105, over which it passes, mounted on a bracket 106 secured to square shank 107 which fits in a square socket 108 supported by a leg 93 and is engaged at its end by a threaded member 108ª operated by a hand wheel 109. It will be apparent that rotation of the hand wheel will move the idler sprocket outwardly or allowing it to move inwardly to tighten or loosen the chain.

To insure the proper engagement of the steel rotating pinions 44 with segmental gear 36 when they first come in contact with the teeth thereof, a geared segment 110 is pivoted at the end of a long arm to the frame of the gear 36, at 111. This geared segment 110 is in a plane higher than the plane of gear 36 because at the point where the steel pinions meet these gears the former are raised somewhat as will hereinafter appear. The two segments overlap slightly, the teeth being in vertical alinement throughout such overlap, as shown in Fig. 10. A block 112 pivotally mounted on the gear 36 has an aperture therethrough on which slides a rod 113 the other end of which is pivotally secured to the arm of the geared segment 110. A coiled spring 114 surrounding said rod bears against the block 112 and against a nut 115 on the rod thereby tending to press the geared segment 110 outwardly, but so as to permit it to give when engaged by the pinions 44, the function of which hereinafter appears.

The operation, in general, is such that the cans with caps in place are brought up to the capper by an endless conveyer, thence they are swept onto a rotating table over which is suspended a plurality of capping steels and vent rods which travel therewith, means being provided whereby the cans are spaced and centered so that each one comes directly beneath a capping steel. As the apparatus rotates the soldering process takes place and the cans are finally swept from the table onto a second endless conveyer which carries them away in spaced relation, in a course in alinement with that in which they were fed to the apparatus.

In more detail the operation is as follows: It will be apparent that the motion of substantially all of the parts depends on the large table bearing gear 20. This gear derives its rotation from the power pulley 32, shaft 29, gears 30, 31, shaft 23 and pinion 22 when the clutch is thrown in by lever 34. As gear 20 rotates it obviously carries table 21 with it and by means of the pin 19 and arm 18 the central column 13ª is also rotated. The capping steels, vent rods and lifting arms are caused to travel in unison with the table by the spider 42 and the fire boxes by their pipe connections with the central column.

This large gear 20 also rotates the two smaller gears 77 and 63 with which it meshes. The former of these drives the feeding star sweeper 80 through shaft 78; the latter drives the discharge star sweeper 69 through shaft 64 and by the pinion 66 on the same shaft gears 67 and the shaft 68 are driven, the latter driving the feeding conveyer chain through spiral gears 71, 72, shaft 73 and sprocket 74, and the discharging conveyer chain through gears 99, 98, shaft 94 and sprocket 96.

Considering the clutch thrown in and the parts moving as above described cans are fed to the conveyer 75 in such a manner that they are engaged by the lugs 76 of the conveyer and carried up to the star sweeper 80 in spaced relation. The latter member, in connection with the guide 83 causes the cans to be deflected from the conveyer, across the stationary table 81 onto the rotating table 21, the guide 87 aiding in centering the cans so they will take the proper position under the capping steels. As each can takes its proper place the corresponding capping steel and vent rod drop by gravity into capping position, the vent rod holding the cap in place and the heated steel, which is rotated on its own axis due to the pinion 44 running over the gear 36, performing the soldering operation. The parts remain in this position for about one third of their revolution. Then the roller 38 of the lifting arm strikes the cam surface 37$^a$ of the cam track 37 and the arm is raised thereby raising the sleeve 43 by its engagement with the collar 45 to lift the capping steel out of contact with the can cap. As there is now no necessity for rotation of the steel on its own axis the teeth of gear 36 do not extend beyond this point. The vent rod remains in contact with the cap to prevent it from moving while the solder cools, during approximately another third of the revolution. Further travel brings the roller 38 to the higher cam surface 37$^b$ thus causing the lifting arm to raise the sleeve farther and to an extent to cause it to engage the weight 43$^b$ of the vent rod 43$^a$ thus raising the latter from contact with the can cap. In this position of the parts the capped can is deflected from the table by guide 84 and star sweeper 69 to the discharge conveyer where it is engaged by lugs 97$^a$ thus causing it to be carried away in spaced relation and finally it is deflected onto the receiving chute 100.

At the same time a fresh can is taking its place, and the roller 38 descending from the cam surface to normal level on the track 37 allows the capping steel and vent rod to drop by gravity to the cap, and the above operation continues. In the above description the course of only one can with its corresponding steel, vent rod, and lifting arm has been traced. It will be apparent, however, that the operation of the other units one after the other is identical, the whole process being continuous as long as power is applied.

In order that the steel-revolving pinions 44 shall mesh properly with the fixed gear I provide the spring-pressed pivoted geared segment 110 which each pinion first encounters. As the steel supporting sleeves at this point have not completely descended to normal level, this segment is in a plane above that of gear 36 and overlaps the latter, the teeth where this overlap occurs being in vertical alinement. Segment 110 forms in effect a resilient continuation of gear 36. If the teeth of pinions 44, when they first encounter segment 110, do not properly mesh therewith, the spring 114 permits the segment to yield, thus allowing the pinion to work around until it is in position to properly mesh. It must, therefore, mesh with the fixed segment 36 when it reaches the latter.

It will be seen that the cans must take definite spaced positions on the rotating table in order to come directly under the steels. If it happens that the arms of the sweeper 80 and the can engaging lugs 76 of the feed conveyer are not in proper timed relation with each other or with the steels to attain such end, the sweep may be adjusted on its shaft by means of the screws 88 to attain the proper timed relation. Similar adjustment may be made with respect to the drive sprocket 74 of the feed conveyer. Likewise the discharge sweep and the drive pinion of the discharge conveyer are adjustable in the same manner so that proper timed relation may be attained between the cans on the table, the arms of the discharge sweeper and the discharge conveyer lugs.

In continuously operating rotary can cappers, not only must the cans take definite positions on the rotary table, but it is necessary that they be conveyed up to the table in spaced relation in order that they may pass the fluxing and cap-dropping devices in proper order and for the action of the feed and discharge sweep. Likewise they must be conveyed away from the capper in spaced relation for the action of the vent-hole tipper and number stamper. If a single conveyer serves for both feeding and discharging, it is difficult to adjust the parts so that the conveyer lugs will be in proper timed relation with both the feed and delivery sweeps. By providing separate conveyers independently adjustable, applicant has made it possible to attain the most exact adjustment.

Having described my invention, what I claim as new and desire to secure by Letters Patent is:

1. In a can capper, the combination with a rotary table on which the cans take spaced relation, a conveyer for carrying the cans up to said table in spaced relation, a second conveyer for carrying the cans away from said table, means for deflecting the cans from the first named conveyer to the table, means for deflecting the cans from the table to the second named conveyer, means for driving said table, conveyers and deflecting means, means for timing said first named conveyer and deflecting means with respect to each other and either with respect to the table, and independent means for timing said second named conveyer and deflecting means with respect to each other and either with respect to the table.

2. In a can capper, the combination with a central non-rotatable shaft, a sleeve rotatably mounted thereon, a plurality of capping steels rotatably associated therewith, a table loosely mounted on said sleeve, means for causing the table to rotate with said sleeve, and means for raising and lowering said shaft thereby to cause said sleeve to raise or lower said capping steels with respect to said table.

3. In a can capper, the combination with a rotary table for the cans, of means for rotating the same, a conveyer for carrying the cans up to said table, a sprocket for moving said conveyer rotatably adjustable on a shaft, means for driving said shaft and sprocket, a rotary sweep for deflecting the cans from said conveyer to said table rotatably adjustable on a shaft, means for driving said shaft, a second conveyer for carrying the cans away from said table, a second rotary sweep for deflecting the cans from the table to said second conveyer rotatably adjustable on a shaft, means for driving said shaft and sweep, a gear rotatably adjustable on a shaft, means for driving said shaft and gear, and means for driving said second conveyer from said gear.

4. In a can capper, the combination with a plurality of capping steels, of fire boxes for housing said steels, said fire boxes comprising a plurality of arcuate members of less number than the number of steels, partially housing said steels, and a plurality of caps, one for each steel, for completing the housing.

5. In a can capper, the combination with a plurality of capping steels, of fire boxes for housing said steels, said fire boxes comprising an arcuate channeled member having apertures in its upper and lower flanges for a plurality of said steels, a plurality of caps one for each steel having apertures corresponding to said first named apertures, and means for securing said caps to said channeled member.

6. In a can capper, the combination with a plurality of capping steels arranged in a ring, of fire boxes for housing said steels, said fire boxes comprising a plurality of arcuate channeled members substantially less than the number of said steels secured together to form a channeled ring partially housing said steels, and a plurality of caps, one for each steel secured to said arcuate members to complete the housing, there being a channel leading from one steel to another completely around the ring.

7. A can capping machine comprising a non-rotating vertical shaft, a gear having a hub portion having a bore through which said shaft extends, said gear being non-rotatably mounted on said shaft, a plurality of capping steels, means for causing said steels to move in a circular path about said shaft, pinions associated with said steels and meshing with said gear, and means for supplying fuel adjacent said steels including a passage in said hub portion.

8. A can capping machine comprising a non-rotating vertical shaft, a gear having a hub portion having a bore through which said shaft extends, said gear being non-rotatably mounted on said shaft, a plurality of capping steels, means for causing said steels to move in a circular path about said shaft comprising a sleeve rotatable about said shaft, pinions associated with said steels and meshing with said gear, means for supplying fuel adjacent said steels including a passage in said hub portion, and a passage in said sleeve in communication with said first passage.

9. A can capping machine comprising a non-rotating vertical shaft, a gear having a hub portion having a bore through which said shaft extends, said gear being non-rotatably mounted on said shaft, a plurality of capping steels, means for causing said steels to move in a circular path about said shaft comprising a sleeve rotatable about said shaft, pinions associated with said steels and meshing with said gear, a casing in which said steels are located supported by said sleeve, and means for supplying fuel to said casing comprising a passage in said hub portion, and a passage in said sleeve in communication with said first passage.

In witness whereof, I have hereunto subscribed my name in the presence of two witnesses.

JAMES P. HAIGHT.

Witnesses:
EDWARD P. SHERIDAN,
J. B. HART.

Copies of this patent may be obtained for five cents each, by addressing the "Commissioner of Patents, Washington, D. C."